May 12, 1931.                    J. B. ZALLIO                    1,805,198
                              FOOD SERVICE DEVICE
                              Filed March 18, 1930
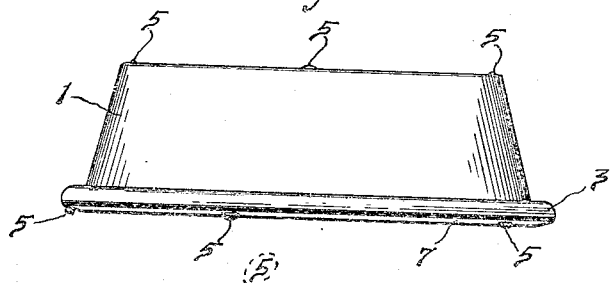
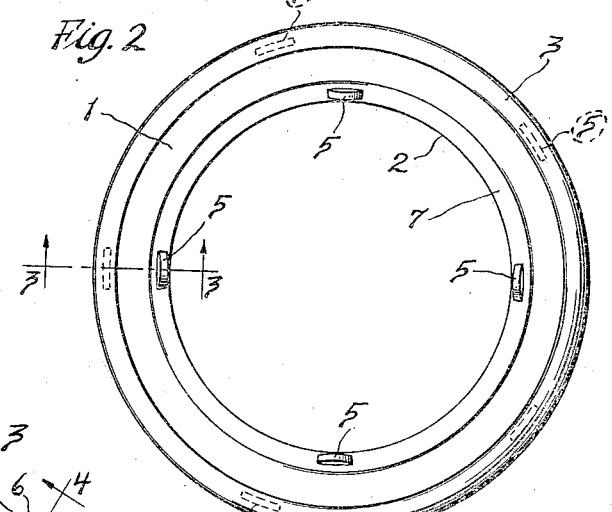
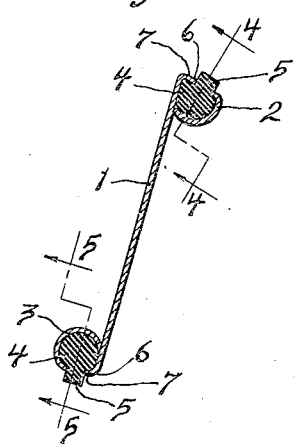
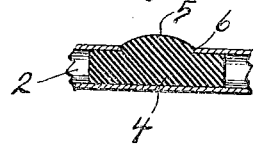
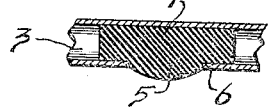
INVENTOR.
John B. Zallio
BY *Robert F. Miehle, Jr.*
ATTORNEY Patented May 12, 1931

1,805,198

UNITED STATES PATENT OFFICE

JOHN B. ZALLIO, OF CHICAGO, ILLINOIS

FOOD SERVICE DEVICE

Application filed March 18, 1930. Serial No. 436,671.

My invention has for its general object the provision of an improved food service device which is adapted to permit the stacking of food laden dishes with comparative safety, with a view toward the provision of such an article which is simple and well adapted for its purpose.

With this object in view my invention consists in certain features of novelty in the construction, combination, and arrangement of parts by which the said object and certain other objects, hereinafter appearing, are effected, all as fully described with reference to the accompanying drawings and more particularly pointed out in the appended claims.

In the drawings—

Figure 1 is a side elevation of a dish cover embodying my invention;

Figure 2 is a top plan view of the same;

Figure 3 is an enlarged section on the line 3—3 of Figure 2;

Figure 4 is a section on the line 4—4 of Figure 3; and

Figure 5 is a section on the line 5—5 of Figure 3.

Like characters of reference indicate like parts in the several views.

Referring to the drawings, 1 designates a frusto-conical shell or body, preferably formed of suitable sheet metal such as aluminum. See Figures 1 and 2.

The edge portion of the upper or small end of the body is turned inwardly to form a continuous tubular edge portion 2, and the edge portion of the lower or large end of the body is turned outwardly to form the other continuous tubular edge portion 3. See Figures 2 and 3.

Engaged in these tubular edge portions are non-metallic contact means in the form of soft rubber contact members 4 spaced along said tubular formations and provided with contact portions 5 spaced correspondingly along said tubular formations and projecting through apertures 6 in the walls of said tubular formations and spaced therealong for contact with upper and lower dishes between which the device is interposed.

Preferably, as shown, the contact portions 5 and the apertures 6 are elongated axially of the tubular formations, and the outer surfaces of the contact portions 5 are convex longitudinally of the tubular formations and substantially merge with the outer surfaces of the tubular formations at the ends of the apertures 6 so that they are more sanitary and do not catch upon a cloth as in the cleaning thereof. See Figures 2, 3 and 4.

Thus it will be seen that the contact members 4 are adequately secured on the body and that only a small portion thereof is exposed, this being conducive to sanitation as well as is the simple continuous form of the device.

The contact members 6 engage the dishes between which the device is interposed and tend to prevent slipping thereof, and, spacing the plates from the body of the device, provide for the ventilation of the space inside the device, at the same time adequately enclosing the same.

The tubular formations 2 and 3 are preferably flattened, as designated at 7, to correspond with the portions of the surfaces of the dishes between which the device is interposed. See Figures 1 and 3.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

Claims:

1. In an article of the character described the combination of a hollow body provided with a continuous tubular edge formation, and contact means engaged in said tubular formation and projecting through apertures in the wall of and spaced along said tubular formation to form spaced contact portions.

2. In an article of the character described the combination of a hollow sheet metal body provided with an integral continuous tubular edge formation and non-metallic contact means engaged in said tubular formation and provided with contact portions projecting through apertures in the wall of and spaced along said edge formation.

3. In an article of the character described the combination of a hollow sheet metal body provided with an integral continuous tubular edge formation, and a plurality of soft rubber members engaged in said edge formation and spaced therealong and provided with contact portions projecting through apertures in the wall of and spaced along said edge formation.

4. In an article of the character described the combination of a hollow sheet metal body provided with an integral continuous tubular edge formation, and soft rubber contact means engaged in said edge formation and provided with contact portions spaced along and elongated axially of said tubular formation and projecting through apertures in the wall of and elongated axially of and spaced along said tubular formation, the outer surfaces of said contact portions being convex longitudinally thereof and substantially merging with the outer surface of said tubular formation at the ends of said elongated apertures.

5. In an article of the character described the combination of an open sheet metal annular shell having one edge portion thereof turned inwardly to form a continuous tubular edge formation and having the other edge portion thereof turned outwardly to form the other tubular continuous edge formation, and non-metallic contact means engaged in said tubular formations and projecting through apertures in the wall of and spaced along said tubular formations to form spaced contact portions.

6. In an article of the character described the combination of an open sheet metal substantially frusto-conical shell having the edge portion at the small end thereof turned inwardly to form a continuous tubular edge formation and having the other edge portion thereof turned outwardly to form the other continuous tubular edge formation, and soft rubber contact means engaged in said edge formations and provided with contact portions spaced along and elongated axially of said tubular formations and projecting through apertures in the walls of and elongated axially of said tubular formations, the outer surfaces of said contact portions being convex longitudinally thereof and substantially merging with the outer surfaces of said tubular formations at the ends of said elongated apertures.

In witness whereof I hereunto affix my signature this 1st day of March, 1930.

JOHN B. ZALLIO.